INVENTOR.
W. D. Hailes,
BY Neil W. Preston,
HIS ATTORNEY

Patented Nov. 22, 1949

2,488,815

UNITED STATES PATENT OFFICE 2,488,815

OCCUPANCY DETECTING MEANS FOR CONVEYANCES

William D. Hailes, Brighton, N. Y., assignor to General Railway Signal Company, Rochester, N. Y.

Application March 22, 1946, Serial No. 656,208

11 Claims. (Cl. 177—352)

This invention relates to an inductive detecting system and more particularly to apparatus for detecting the presence of an airplane on the runway of an airport.

In taxiing airplanes over the ground and runways of an airport, especially during conditions of fog, snowfall, and the like, it is quite hazardous for airplanes to get to their desired destination on the ground. In view of the foregoing and other important considerations it is proposed, in accordance with the present invention, to provide one or more suitable loops of conducting material which are tuned to resonate with the alternating current applied thereto, to provide means to detect the flow of alternating current in such loops, the current being of magnitude and frequency such that the presence of an airplane in the vicinity of such a loop will cause a change in the magnitude or phase of the flow of current in such loop due either to losses or detuning to thereby manifest the presence of the airplane and control a signal. More specifically, it is proposed to divide a runway into a plurality of blocks each of which preferably includes a plurality of loops or meshes and to feed each except the first loop by or in accordance with current flowing in the next preceding loop as a result of which the detuning of a loop circuit due to the presence of an airplane or the attenuation or phase of the current in such loop circuit due to the presence of such airplane will cause the electro-responsive means to be operated. It is further proposed to provide a signal at the entrance to such block and control such signal in accordance with the current flowing in the last loop of the block. In accordance with several forms of the present invention it is proposed to detect the flow of current in one loop of a block and then amplify it and apply it to the next loop of such block. In accordance with certain other forms of my invention I propose to code the alternating current applied to the first loop of a block as a result of which coded current will under unoccupied traffic conditions flow in the last loop of such block and to in turn control a signal in accordance with whether or not coded current of the proper frequency is detected in the last loop.

Other objects, purposes and characteristic features of this invention will in part be pointed out in the following description and will in part be obvious from the accompanying drawings, in which—

Figure 1:
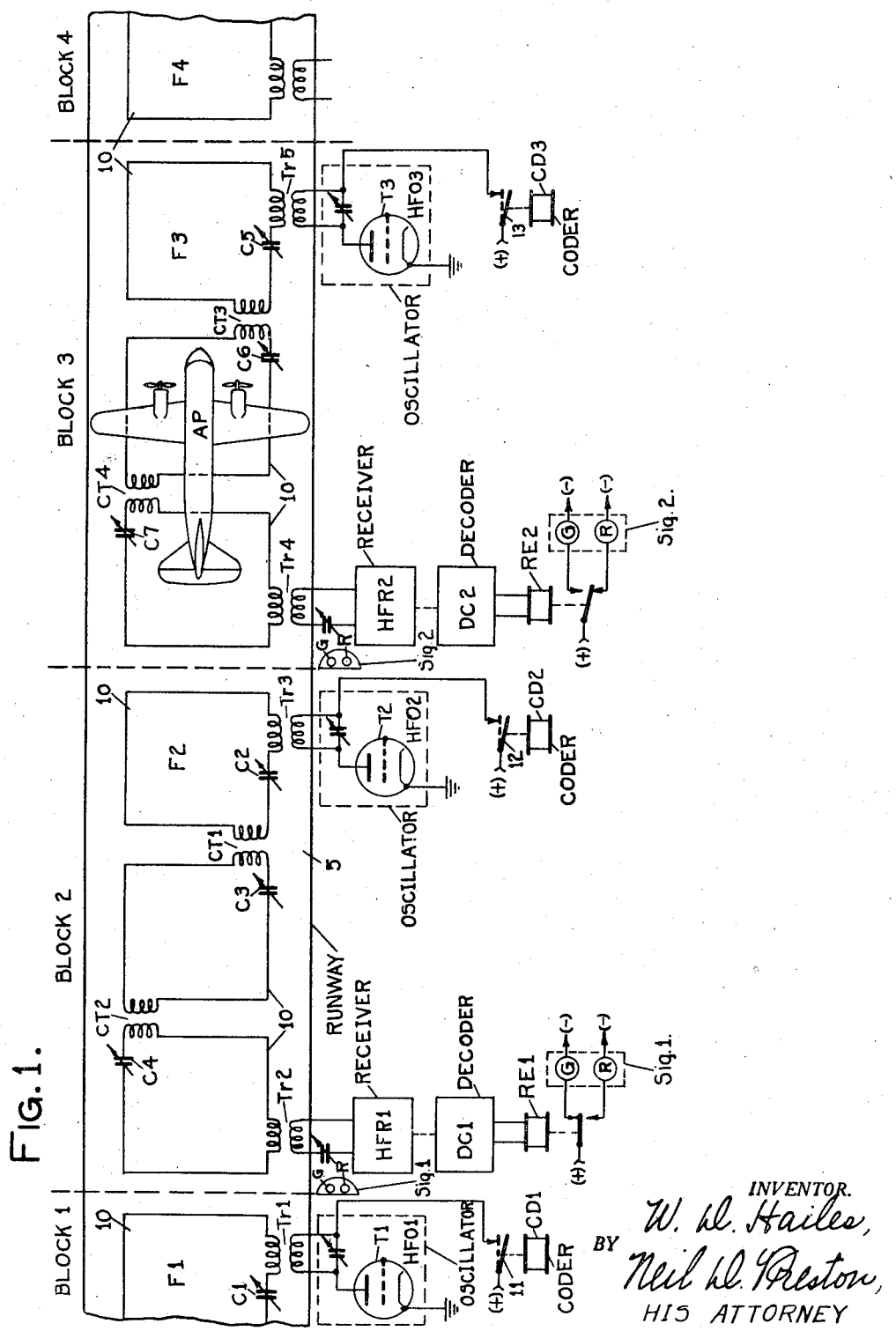
Fig. 1 shows a runway divided into a plurality of blocks each block of which contains a plurality of detecting loops, which loops are electro-magnetically coupled together by transformers.

In Fig. 1 of the drawings there has been illustrated a runway 5 of an airfield which runway is divided into blocks 1, 2, 3 and 4 each block of which includes a plurality of loops or meshes 10, three such loops 10 per block having for convenience been illustrated for blocks 2 and 3. The first loop of block 2 is connected to the second loop of this block 2 by a coupling transformer CT1 whereas the second loop of this block is connected to the third loop thereof by the coupling transformer CT2. In like manner corresponding loops of block 3 are connected together by coupling transformers CT3 and CT4 respectively. The loop of block 1 shown is tuned to resonate to current of frequency F1 by a condenser C1 whereas the loops of block 2 are resonated to frequency F2 by condensers C2, C3 and C4 and the loops of block 3 are resonated to frequency F3 through the medium of condensers C5, C6 and C7.

It may be pointed out here that a plurality of loops rather than a single loop are provided for each block in order that an airplane AP may be more critically detected. For like reasons, coded energy is preferably applied to these various loops and suitable code responsive current detecting means is preferably provided to more critically detect the presence of an airplane. In this connection it is emphasized that in detecting the code a code following relay is preferably employed as a result of which the current, to produce an occupied manifestation, need only be reduced to a point where the relay will not again pick up whereas if coding is not employed the current must be reduced to the dropaway value of the relay. In other words, a code type system will detect current reduction more critically. It should, however, be understood that if desired the signal control relay RE hereinafter described may be connected directly to the last loop of the block in which case decoding apparatus and the coding contact hereinafter referred to will be omitted and the oscillator or other alternating current source will be connected continuously to the first loop of the block.

In the specific form of the invention shown in Fig. 1 the current applied to each block is of a different frequency than that of the frequency applied to adjacent blocks, the loops of block 2 being energized by current of frequency F2 whereas the blocks 1, 3 and 4 are energized by currents of frequencies F1, F3 and F4, respectively. Blocks 1 and 3 have not been specifically described but like parts thereof have been assigned like reference characters with distinctive suffixes.

As shown, energy is applied to the first loop of block 2 through the medium of a transformer Tr3, the applied current being of sufficiently high frequency to render each loop by itself capable of detecting the presence of an airplane. This current preferably of radio frequency in the particular arrangement illustrated is preferably derived from a high frequency oscillator HFO2 for block 2, the anode circuit of which is coded through the medium of a coding contact 12 of a coder CD2. Blocks 1 and 3 are provided with similar coders CD1 and CD3 having coding contacts 11 and 13 respectively. The high frequency oscillators HFO2, as well as the high frequency oscillators HFO1 and HFO3 illustrated, may be of any suitable construction. That is, the oscillation of the anode current of their respective electron tubes T2, T1 and T3 at a specific frequency may be accomplished by a feed-back arrangement including either a tuned grid circuit, a tuned plate circuit, or may be obtained by the production of a phase shift in an auxiliary feed-back circuit which causes the oscillator to oscillate at a frequency such that the phase of the current passed from the plate circuit to the grid circuit is just in time phase to produce oscillation. Or, if desired, the oscillation may be produced by the provision of a negative resistance unit in multiple with a tank circuit or oscillating unit. Since the specific oscillator used is a matter of choice, no specific oscillator circuit has been shown. The coders CD1, CD2 or CD3 may be either individual coders operated from a local source of current or may be repeater relays which repeat the operation of a single master coder.

With this understanding of the invention illustrated in Fig. 1 it is readily seen that the coder CD2 and the high frequency oscillator HFO2 will induce radio frequency alternating current in the first loop of the block 2 periodically, from whence this current may through the medium of coupling transformer CT1 be passed to the second loop, from whence energy may be passed on to the third loop through the medium of coupling transformer CT2 and the current flowing in this third loop may be fed to the high frequency receiver HFR1 through the medium of the transformer TR2. The energy so detected by this high frequency receiver HFR1 is then decoded by the decoder DC1. When current of the proper magnitude, frequency and code is received by the decoder DC1 it will cause the relay RE1 to be maintained continuously energized to thereby light the green lamp G of signal 1. Should an airplane, such as airplane AP, either cross the block 2 or pass lengthwise thereover the presence of this airplane will produce sufficient attenuation of the current received by the high frequency receiver HFR1 that the relay RE1 will assume its deenergized position and thereby cause extinguishment of the green lamp G and the lighting of the red signal lamp R of the signal 1. This attenuation of the current may be due either to the absorption of energy or to the detuning of one or more tuned circuits. These signal lamps G and R may be located under suitable transparent housings located partly under ground so that the pilot may be informed as to traffic conditions in advance and at the same time these signals will not constitute obstructions to the free movement of airplanes over the runway. In like manner the loops are preferably imbedded in tubes of insulating material just below the surface of the runway so that they will not interfere with the free movement of airplanes over the runway.

Figure 2:
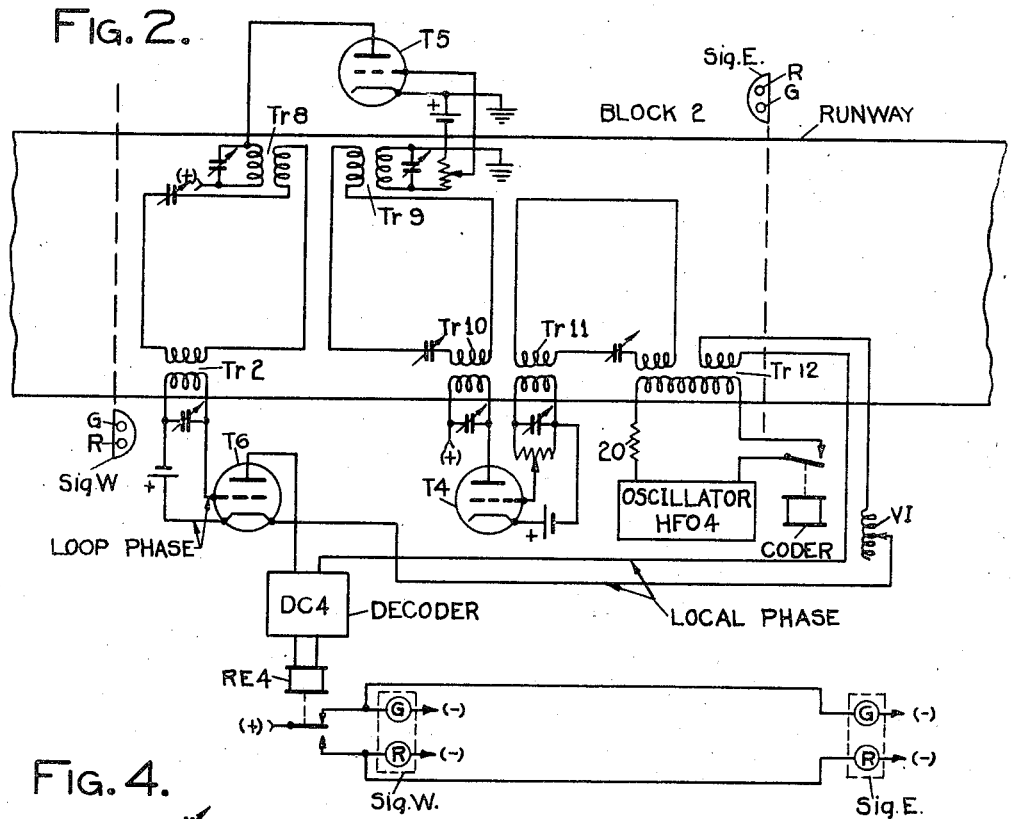
Fig. 2 shows a single block of a modified form of this invention in which alternating current energy is fed from one loop to its adjacent loop through the medium of an amplifier and in which the current detecting means employed is not only responsive to the value but is also responsive to a change in phase of the detected alternating current.

In Fig. 2 of the drawings one block of detecting apparatus has been illustrated similar to that illustrated in Fig. 1 but in this form of the invention energy is shown fed from one loop to an adjacent loop through the medium of an electronic amplifier. It should be understood that other forms of coupling may be used. By this construction the current density in all of the various loops of a particular block may be held during block unoccupied conditions at substantially the same value. As illustrated an amplifier including the electron tube T4 is used for feeding energy from the first to the second loop of the block (Fig. 2) and an amplifier including the electron tube T5 is used for feeding energy into the third loop of the block in accordance with energy flowing in the second loop of the block. The first mentioned amplifier includes transformers Tr10 and Tr11 whereas the second mentioned amplifier includes transformers Tr8 and Tr9. It will be observed that the high frequency oscillator HFO4 not only supplies radio current to the first loop of the block shown in Fig. 2 but also supplies energy through the local phase circuit to the plate of the electron tube T6, the grid circuit of this tube being fed by energy derived from the third loop of the block through the medium of the transformer Tr7. The phase relation of the potentials applied to the plate circuit and the grid circuit of tube T6 is, under normal unoccupied conditions, such that the plate current is a maximum, a suitable phase adjusting means such as the variable inductance VI being used to obtain this normal phase relationship. From this construction it is readily seen that the decoder DC4 included in the plate circuit of the electron tube T6 is not only dependent for its energization upon the value of the current supplied to the grid circuit of the electron tube T6 but is also dependent upon the phase relationship between this current and the current supplied to the first loop of the block. In other words, the detecting apparatus including the tube T6, decoder DC4 and the relay RE4 of the Fig. 2 construction is not only energy responsive but is also phase responsive. This phase responsive detecting apparatus has been resorted to in order that the presence of an airplane may not only be detected by the current attenuation caused by the presence of such airplane but may also be detected in accordance with lag or lead produced in the current flowing in the loop due to the airplane's electromagnetic association with such loop.

Figure 3:
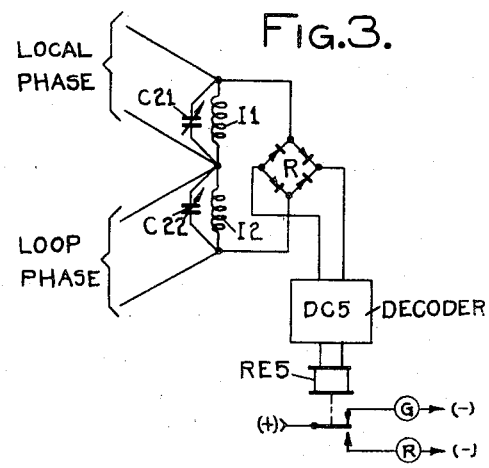
Fig. 3 shows a modified form of the quantitative and phase responsive detecting means illustrated in Fig. 2.

Instead of using an electron tube and connecting it in a manner to cause it to be phase responsive for detecting the presence of an airplane as shown in the Fig. 2 construction a simple relay RE5 fed by a full-wave rectifier R which rectifier is fed by energy derived from both the local and the loop source in series as illustrated in Fig. 3 of the drawings, may be used. In this arrangement the local phase is connected across a tuned unit including an inductance I1 and a condenser C21 in multiple whereas the loop phase is connected across a tuned unit including the inductance I2 and the condenser C22 in multiple. These tuned units, tuned to the frequency of the current used, are then connected in series, as shown in Fig. 3, and across the rectifier R. The phase relationship of the local phase and loop phase voltages are so adjusted, as for instance by adjusting the variable impedance VI of Fig. 2, so that these voltages are in exact phase when the loop is unoccupied. The current delivered by the rectifier R is therefore reduced even though only phase shifting of the current flowing in the loop is produced by the presence of an airplane. The various constants of the apparatus for the structure shown in Fig. 2, when modified as shown in Fig. 3, are such that the local phase and the loop phase currents across the two tuned units illustrated in Fig. 3 are, under normal unoccupied conditions, substantially in phase and the resulting current detected by the rectifier R and the relay RE5 is just sufficient to pick up a relay. Since the currents detected are coded, a code following relay included in the decoding apparatus DC5 is intermittently dropped down. If now, due to the presence of an airplane in one of the loops (not shown), of the Fig. 3 structure, the current delivered by rectifier R is slightly reduced, due either to a reduction of current or change of phase, this code following relay (not specifically shown) will remain in its deenergized position and the relay RE5 will drop and remain dropped and display a danger signal. The decoding apparatus illustrated in Figs. 1, 2 and 3 may, for instance, be of a construction such as shown in the Judge Patent No. 2,218,211; or the Phinney et al. Patent No. 2,344,460, dated August 23, 1938, and May 23, 1944, respectively.

From the Fig. 3 structure it is readily apparent that if the two voltages applied to the two units I1—C21 and I2—C22 are normally in exact phase, any change in phase will reduce the voltage applied to the rectifier R and likewise, a reduction in voltage of either of the two phases will also reduce the voltage applied to rectifier R. In other words, the apparatus shown in Fig. 3 is both current value and current phase responsive. It is also understood that the presence of an airplane in one of the loops of Fig. 2 as shown or when modified as illustrated in Fig. 3 may produce attenuation of the current by energy absorption or by detuning of the loop circuit and that phase shift may result in either case to further assure the display of a danger indication.

In the Fig. 2 construction the electronic tube T6 may be either a high vacuum type tube or a gas filled tube of the thyratron type. In either case the current pulse of each cycle will be of a value dependent on the phase relationship of the potentials applied to the grid and plate circuits of the tube. If a gas filled tube is used the plate circuit current will continue to flow, after once started, until the plate voltage is substantially zero even though the grid voltage which started the flow of this plate current has disappeared earlier. Obviously, whether a high vacuum type tube or a thyratron is used the structure is both loop current value and loop current phase responsive and therefore lends itself admirably well to airplane detection.

Figure 6:
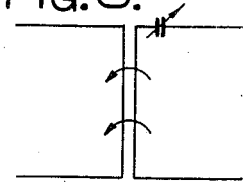
Fig. 6 illustrates how two adjacent loops may be inductively connected to each other without the employment of either a transformer or an amplifier.

By referring to Fig. 1, it is readily seen that current may be induced from the first loop into the second loop or from the second loop into the third loop of block 2 even though the transformers CT1 and CT2 were entirely omitted. Such induction would be due to the loops acting as a primary and a secondary of a transformer. Such an arrangement may be called inherent induction and has been shown in Fig. 6. The extent to which current may be induced from one loop into an adjacent loop by inherent induction depends of course on the frequency of the current used, the proximity of the loops to each other and other factors. It should be understood that either of these methods of inducing high frequency current from one loop into another, inherent induction or deliberate induction, may be used, if desired. From these considerations it is also apparent that if the coupling transformers illustrated in Fig. 1 are poled in one way or another the two coupling effects produced either deliberately by the transformers or inherently by the proximity of the loops to each other may be either accumulative or bucking, and it should be understood that in accordance with the present invention the coupling transformers may be poled in either direction. That is, the coupling transformer may be poled to either aid or oppose the inherent coupling effect between the corresponding adjacent loops. It should also be understood that the inherent coupling alone (see Fig. 6) may be used, if desired.

Figure 4:
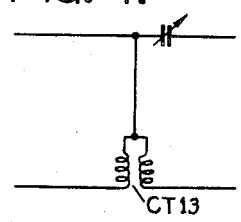
Fig. 4 illustrates how the coupling between adjacent loops of Fig. 1 may be modified to make a portion of one loop electrically common with a portion of an adjacent loop.
Figure 5:
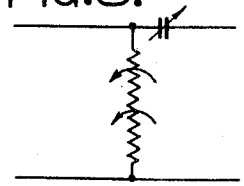
Fig. 5 illustrates how adjacent loops may be both conductively and inductively connected together.

It is apparent that adjacent loops need not be insulated from each other at the points where they lie adjacent each other, for which reason a common wire may be used to serve as a portion common to both loops. Such a construction, wherein a coupling transformer CT13 is used, has been illustrated in Fig. 4 and this construction may be used if desired. If the coupling transformer of Fig. 4 is a dispensed with we have only a single wire constituting the common portion of two adjacent loops and such a construction has been shown in Fig. 5 and may be used, if desired. Although the common portion of the two adjacent loops shown in Fig. 5 has been illustrated as a resistance it should be understood that this resistance may be of any desired ohmic value and if a low ohmic value is used the connection will constitute merely a simple wire of low resistance.

It should be understood that in the systems shown in Fig. 1 and Fig. 2, and in modifications thereof as illustrated in Figs. 3, 4, 5 and 6, the energy supply source which feeds alternating current energy to the block is purposely so constructed as to have very poor regulation or for some other reason, such as having constant output characteristics, will allow only a predetermined amount of energy to flow into the net work. By this construction any energy absorbed by an airplane in any loop of the block will cause a reduction in the energy available at the detector end of the block. By this construction the attenuation of current due to the presence of an airplane in the block which absorbs energy therefrom will be more pronounced and this attenuation may be further aggravated by the detuning of the circuits as already pointed out. Such constant out-put characteristics may be obtained, for instance, by inserting a comparatively high resistance unit 20 in series with the primary winding of the transformed Tr12, as shown.

As shown in the drawings a signal is provided only at one entrance end of each block but obviously a duplicate signal may be provided at the opposite end of the block, each signal being faced in a direction to be visible by a pilot attempting to enter that end of such block and both signals of each block controlled in the same manner. This could, for instance, be accomplished by connecting corresponding lamps G and corresponding lamps R of signals Sig. W and Sig. E of the same block in multiple as shown in Fig. 2 of the drawings. Obviously, these lamps may, if desired, be connected in series instead of in multiple. By either of these provisions both ends of a block will be protected against entrance of an airplane when such block is occupied. In other words, signals for two directions of running will be provided for. Also, if desired, a caution indication may be provided by having such caution signal displayed when the block at the entrance to which it is located is unoccupied but the next block in advance thereof is occupied. Signal circuits of this latter type are old in the railway signal art and need not be specifically illustrated. Attention is directed to the patent to Peabody, No. 1,627,453, granted May 3, 1927, as an example of such signal circuits.

Although a description of the operation of the system is believed unnecessary it may be desirable to consider some phases of its operation. It is of course the presence of the airplane in the loop that attenuates and/or phase shifts the current flowing in the loop circuit. Airplanes have at least three qualities that can affect the loop circuit. An airplane may have enough iron therein to change the distribution of the magnetic field, it may have sufficient conducting qualities to cause an absorption of energy by eddy currents and it may impose enough static effect to detune the tuned loop circuit by condenser action to thereby cause attenuation and phase shift of the current. Any one or more of these phenomenon may aid in the detection of an airplane on a runway in accordance with applicant's invention. One of the reasons for employing a plurality of loops instead of a single loop is to afford sharper tuning. The sharpness of tuning is greatly interferred with by the internal resistance of the circuit to be tuned. By using a short and more or less square loop the circuit can be more sharply tuned and be rendered more critical. Also, the more nearly the airplane size conforms to the size of the loop the more pronounced will be the effect the airplane will produce in the loop. Each loop constitutes a link of a chain and if any one of these links fails the entire chain fails. That is, if any link fails to deliver the requisite out-put the normally energized relay connected to the out-put end of the last loop will assume its de-energized position and manifest occupancy of the block of the runway. In those cases where coded current is used the reduction or phase shift in the current need not even be enough to drop the code following relay but need only be enough to cause it to fail to pick up. That is, a detecting system of the normally energized, or closed circuit, type is much more critical when coded energy is used than when continuously applied energy is employed.

Detuning by the presence of an airplane near the loop may be due to an increase of inductance relative to the capacitance of the loop brought about by a reduction of the reluctance of the surrounding space or may be due to an increase in capacity relative to the increase in inductance by reason of the airplane acting as a plate of a condenser. In either case, the phase of the current flowing in the loop will be changed. Furthermore energy may be absorbed from the loop due to eddy currents induced in the metallic portions of the airplane. This will of course cause additional attenuation of the current detected at the signal control relay.

Having thus shown and described various embodiments of the invention it should be understood that the specific embodiments illustrated have been selected to facilitate disclosure of the underlying principles of the invention rather than its scope and it should be understood that various changes, modifications and additions may be made to meet the various problems encountered in practicing the invention without departing from the spirit or scope of the invention except as demanded by the scope of the following claims.

What I claim as new is:

1. In a system for detecting the presence of an airplane on a runway, the combination with a plurality of detecting loops arranged end-to-end longitudinally in a longitudinal portion of the runway constituting a block, means for electrically coupling adjacent loops of the same block to each other so that the flow of alternating current in one loop will cause the flow of alternating current in the next loop located in a direction away from the source supplying such current, a source of alternating current, coding means for supplying coded current derived from said source to the loop at one end of said block means for tuning each of said loops to the frequency of said source, code responsive means normally maintained active in response to coded current in the loop at the other end of the block, said code responsive means being rendered inactive whenever any of said loops are detuned by the presence of an airplane in that block, and signal means distinctly conditioned in accordance with whether or not said code responsive means is active.

2. In a system for detecting the presence of an airplane on a runway, a plurality of detecting loops arranged longitudinally end-to-end along a portion of the runway constituting a block and imbedded in the runway of the block, a source of radio frequency alternating current intermittently applying current to the loop at one end of the block, means for inductively coupling adjacent loops of the same block to each other end-to-end so that the flow of alternating current in one loop will cause the flow of alternating current in the next loop located in a direction away from said source of current, means for tuning each of said loops to the radio frequency of said source, code responsive means connected to the loop at the other end of the block, said code responsive means being rendered active except when any one of said loops is detuned by the presence of an airplane in the block, and signal means controlled by said current responsive means so as to indicate occupancy of said block when said code responsive means is inactive.

3. In apparatus for detecting the presence of an airplane on a runway that is divided into a plurality of blocks, a plurality of current conducting loops disposed end-to-end along the runway in each block, a source of alternating current of distinctive frequency for each of several successive blocks, said source being coupled to the first loop at one end of that block, means for tuning each loop to the frequency of the source supplying current to said first loop of that block, means for inductively coupling the adjacent loops of each block so that the current available at one end of one loop is supplied to the adjoining end of the next adjoining loop of that block, alternating current responsive means coupled to the last loop of each block, said alternating current responsive means being maintained normally active solely in accordance with energy fed through the respective loops of the associated block, and said alternating current responsive means being rendered inactive by the detuning of the loop circuits due to the proximity of an airplane, and signals controlled by said alternating current responsive means.

4. In apparatus for detecting the presence of an airplane on a runway that is divided into a plurality of blocks, a plurality of current conducting loops disposed end-to-end from the entrance to the exit end of each block, a source of alternating current of distinctive frequency for each of several successive blocks, said source being coupled to the first loop at the exit end of that block, means at the exit end of each of the blocks for coding the current supplied to said first loop of that block, means for tuning each loop to the frequency of the source supplying current to the first loop of that block, means for inductively coupling the adjacent loops of each block so that the current available at the exit end of one loop is supplied to the entrance end of the next loop of that block, coded alternating current responsive means at the entrance end of each block, said current responsive means being rendered active in response to energy fed through the loops of its associated block, only provided that such energy is of the frequency of said source for that block, and only provided that such energy is coded at the rate of said means for coding, and said current responsive means being rendered inactive in response to the detuning of one or more loops in the associated block by the presence of an airplane, and signals distinctively controlled by said coded current responsive means.

5. In apparatus for detecting the presence of an airplane on a runway that is divided into a plurality of blocks, a plurality of current conducting loops extending end-to-end from the entrance to the exit end of each block for a given direction of traffic, a source of alternating current, coding means for distinctively coding said alternating current to characterize a particular code for each of several successive blocks said particular code being supplied to the first loop at the exit end of each block, means for tuning each loop of said block to the frequency of the alternating current source supplying current to the first loop of that block, means for detecting coded current at one loop of each adjacent pair of loops of each block and amplifying the coded current thus detected and applying it to the other loop of such pair, whereby coded current available at the exit end of one loop is amplified and supplied to the entrance end of the next loop of that block, coded alternating current responsive means at the exit end of the last loop of each block, said current responsive means being normally active in response to coded energy fed through the respective loops of that block, but being rendered inactive when one or more of the loops of that block is detuned by the proximity of an airplane and signals controlled by said coded current responsive means.

6. In a system for detecting the presence of an airplane on a runway, the combination with a source of high frequency current, of a plurality of detecting loops arranged longitudinally end-to-end in a block of the runway, the loop at one of said block being fed by said high frequency current and said loops being electrically coupled to each other so that the flow of alternating current in one loop will cause the flow of alternating current in the next loop located in a direction away from the loop energized from said source of current, means for tuning each of said loops to the frequency of said source, each loop being of a length commensurate with the length of the smallest airplane to be detected and the electrical characteristics of the loops being such that the energy available at the exit end of a loop when there is an airplane in that loop is insufficient to manifest an unoccupied condition, current responsive means connected to the last loop of the block and responsive solely to high frequency current transmitted through the respective loops from said source, said current responsive means being normally active but rendered inactive by the presence of an airplane in that block, and signalling means controlled by said current responsive means.

7. In a system for detecting the presence of an airplane on a runway, in combination, a plurality of detecting loops arranged end-to-end longitudinally in a block of the runway, said loops being electrically coupled to each other so that the flow of alternating current in one loop will cause the flow of alternating current in the next adjoining loop within that block, a source of alternating current applied to the loop at one end of the block, means for tuning each of said loops to the frequency of said source, each loop being of a length commensurate with the length of the smallest airplane to be detected and the electrical characteristics of the loops being such that the current transmitted through a loop when there is an airplane in that loop is of a value and phase so as not to manifest an unoccupied condition, a control relay, current value and phase responsive means connected to the last loop of the block effective to maintain said relay in its attracted position only so long as said block is unoccupied, and signal means distinctively controlled in accordance with the respective attracted and retracted positions of said relay.

8. Apparatus for detecting the presence of a metallic object on the ground comprising, a plurality of substantially rectangular loops arranged end-to-end in a row in a manner so that adjacent wires of adjacent loops are substantially parallel to each other and in close proximity to each other and including means for inductively coupling adjacent loops together, means for feeding high frequency alternating current intermittently into the first loop, means for tuning each loop to the frequency of said alternating current, detecting means including a normally energized relay for detecting the presence of corresponding intermittent alternating current in the last of said loops, said relay being normally attracted but being retracted when one or more of said loops is detuned by the proximity of a metal object, and a signal controlled by said detecting means.

9. Apparatus for detecting the presence of a metallic object on the earth comprising, a loop of conducting material, an electronic tube oscillator for generating a high frequency alternating current, coding means for intermittently applying at a predetermined rate alternating current voltage generated by said oscillator to said loop, means for tuning said loop to the frequency of the alternating current voltage generated by said oscillator, detecting means rendered active only when alternating current of said frequency coded at said predetermined rate flows in said loop, said detecting means being rendered inactive by the detuning of said loop due to the presence of a metal object in close proximity thereto, and signal means distinctively controlled by said detecting means in accordance with whether said detecting means is active or inactive.

10. In apparatus for detecting the presence of an airplane on a runway that is divided into a plurality of blocks, a plurality of current conducting loops disposed end-to-end along the runway in each block, a source of alternating current of distinctive frequency supplying current to the loop at one end of each of several successive blocks, means for tuning each loop to the frequency of the source supplying current to a loop of that block, means for electrically coupling the adjacent loops of each block so that the current of one loop is repeated into the adjoining loop, alternating current responsive means at the other end of each block, said alternating current responsive means being rendered active in response to alternating current transmitted through the respective loops of that block only if such current is of the frequency of the source for that block, and said alternating current responsive means being rendered inactive by the detuning of any of the loops of the associated blocks due to the presence of an airplane, and signals associated with each block controlled by said current responsive means to indicate occupancy when said alternating current responsive means is inactive.

11. In a system for detecting the presence of a metal vehicle passing along a specified route, a series of electrically conducting loops arranged end-to-end along said route, each of said loops being of a size comparable to the outline size of the vehicles ordinarily passing over said route, a source of alternating current of a particular frequency for supplying energy to the first loop of said series, transformer means for inductively coupling each loop to the next adjoining loop of the series to cause the flow of alternating current of said particular frequency in each loop of said series, means for tuning each of said loops to a frequency corresponding to said frequency of said source to thereby normally cause maximum currents to appear in each of said loops of said series but which current is materially decreased in any particular loop and all successive loops of the series away from said first loop whenever a vehicle is adjacent that loop, a detecting means connected only to the last loop of said series and normally rendered active by the presence of the normal current in such loop as received over the successive loops of said series but rendered inactive when the current in said loop falls materially below its normal value, said detecting means being responsive only to energy of said particular frequency of said source and rendered inactive by the presence of a vehicle in any one or more loops of said series, and signaling means controlled by said detecting means.

WILLIAM D. HAILES.

REFERENCES CITED

The following references are of record in the file of this patent:

UNITED STATES PATENTS

| Number | Name | Date |
| --- | --- | --- |
| 2,355,395 | Rubenstein | Aug. 8, 1944 |

FOREIGN PATENTS

| Number | Country | Date |
| --- | --- | --- |
| 221,145 | Great Britain | Sept. 4, 1924 |